3,122,442
DRY SOLID COMPOSITIONS FOR MEAT PROCESSING
Louis Sair, Evergreen Park, Ill., assignor to The Griffith Laboratories, Inc., Chicago, Ill., a corporation of Illinois
No Drawing. Filed July 10, 1961, Ser. No. 122,623
14 Claims. (Cl. 99—222)

The present invention relates generally to dry solid compositions for processing meat and used for preparing pickling brines and for addition to meat for comminuted meat products, and in particular, to pH control in processing meat.

The present application is a continuation-in-part of my copending application Serial No. 98,285, filed March 27, 1961, now Patent No. 2,992,116 of July 11, 1961, which is a continuation-in-part of Serial No. 12,693, filed March 4, 1960, now abandoned.

Dry solid compositions for processing meat are used to prepare liquids such as pickling brines, or for direct addition to meat to be comminuted, or being comminuted, or already comminuted. In both cases where curing salt is employed, the reaction with the meat is prompt, but the desired red color develops slowly thereafter. Acidic conditions favor development of the red color. Pickling brines most commonly contain curing salt selected from alkali metal nitrite and nitrate. The quick acting pickles contain nitrite salt as well as nitrate salt. These are commonly used in pumping the pickle into the meat, such as hams and brisket. However, some curing processes immerse pumped meats, especially brisket, for a period of days in a brine bath lacking curing salt in order to develop desired color. Other processes effect the cure by immersing the fresh meat in a curing brine.

Fresh meat varies in its pH ranging from 5.5 to 6.2. Processing agents, such as produce curing and pickling baths, function best when they have a pH on the acid side and preferably near the pH of meat of a freshly slaughtered animal around pH of 6.2.

It is a commercial practice to provide dry solid compositions to be dissolved in water by the user, and the presence of acid in the composition is adverse to the stability of many compositions, especially the curing salt compositions.

Such curing salt compositions comprise essentially a major portion of sodium chloride, a minor portion of alkali metal nitrite, and commonly also a minor portion of alkali metal nitrate. There are other ingredients added for a function in curing the meat or for a function of stabilizing the dry salt composition chemically or physically. For example, an isomer of ascorbic acid or a water-soluble salt thereof, or a mixture of said acid and said salt, is often present for its function in a curing brine made by dissolving the salt composition. Pickle compositions lacking nitrite salt also may contain other ingredients such as an isomer of ascorbic acid or its salt.

Since the presence of acidic material in the dry curing salt composition is detrimental to the stability of its nitrite content, and of both nitrite salt and the ascorbic material, an agent is frequently added having a reserve of alkali, so as selectively to react with any acid which otherwise would release nitrous acid from nitrite salt. Suitable alkali-yielding agents are sodium bicarbonate, sodium carbonate, disodium phosphate, sodium tripolyphosphate, tetra sodium pyrophosphate, trisodium phosphate or mixture of two or more of these.

On forming a brine from a dry curing salt composition containing such an alkali-yielding agent, the agent imparts a pH to the brine higher than that at which a brine of the remaining ingredients would better function. While it is possible to lower the pH of the brine so formed into a more desirable range by adding a suitable acid, this is not a practical procedure for operators who make and use such brines. Such operators are accustomed merely to dissolve the curing salt composition in water in desired proportions.

Other compositions are employed which are desirably non-acid in dry solid form, but which in use are desirably acid.

It is the general object of the present invention to provide solid dry meat-processing compositions which are stable and which generate acid when dissolved in water.

It is a particular object of the present invention to provide stable dry curing salt compositions which on dissolving yield a brine with a pH determined by all the ingredients of the composition, which brine when formed begins automatically to lower its pH into a more suitable range for curing meat.

The present invention is accomplished by including in such a composition a lactone which slowly hydrolyzes and forms harmless acid, which acid gradually neutralizes the reserve alkali of any alkali-yielding agent of the dry composition, or which acid may liberate nitrous acid from the nitrite salt and thereby impart to the brine as a result of its original acidity a pH below 7, or which acid promotes the treatment for which the composition is used.

When a dry curing salt composition containing sodium nitrite, sodium nitrate, and sodium isoascorbate has also a dry solid acid sufficient to give a pH of 6.2 in a pickle the ascorbate and the nitrite are unstable in the dry composition. However, it has been found, for example, that by the use of a lactone in such a composition, which ultimately leads to a pH of 6.2 in a pickle, the ascorbate and the nitrite remain stable in the dry composition.

The pickles described herein may be used as cover pickle or as pumping pickle. The pH of a curing brine below pH of 7 results from the contribution of the acid generated from the lactone and from the contribution of the nitrous acid from the nitrite salt. The nitrous acid is volatile and a brine on standing can lose nitrous acid as a gas with resulting increase in the pH. When meat is present in the brine or the brine pickle is inside the meat, as in pumped hams, the meat takes up the nitrous acid and elevates the pH of the remaining pickle. Also, meat is a buffer so that the relative proportions of brine or pickle and of meat in contact therewith alter the pH of the pickle.

In consequence, the analytical presentation herein of the changing pH of the pickle made from a dry composition is not representative of the pH of the pickle when in the presence of meat. The important fact is that the pickle is more acid because of the presence of the lactone in the dry composition.

There are numerous lactones which slowly hydrolyze in water and which are acceptable for use in the present invention. They vary in rate of hydrolysis so that a lactone may be selected for use with a pickle which is to be used shortly after it is formed, or for use with a pickle which may be held in storage before use, or for use in a process carried out in a period of days.

The lactones so available vary in cost, and fortunately, one which is rather quickly hydrolyzed is the most available in the market and at a cost less than the slower lactones, it being glucono delta lactone, referred to hereinafter as GDL, which hydrolyzes to gluconic acid. Accordingly, GDL is the preferred lactone, and the invention is best illustrated by examples containing it.

EXAMPLE 1

A basic formula has been used as follows:

*Composition A*

| | Parts by weight |
|---|---|
| Sodium chloride | 92 lbs.-8 ozs. |
| Sodium nitrite | 2 lbs. |
| Sodium nitrate | 3 lbs.-8 ozs. |
| Potassium nitrate | 8 ozs. |
| Corn sugar | 11 ozs. |
| Cane sugar | 12 ozs. |
| Acidic agent | $x$ |

The acidic agent has been varied in a series in which a brine is formed, using 30 pounds of the composition in water to produce 47.5 gallons of brine, adding enough sodium chloride to effect a 72° salometer reading. The pH was measured immediately, after 1 hour and after 18 hours. Table I shows the readings:

TABLE I.—VALUE OF $x$ IN COMPOSITION A

| Acidic Agent | $x$ ozs. | pH After Hours— | | | |
|---|---|---|---|---|---|
| | | 0 | 1 | 18 | 24 |
| Anhydrous Citric Acid | 1 | 6.0 | 6.35 | 6.65 | |
| GDL | 1 | 7.2 | 7.0 | 7.2 | |
| GDL | 2 | 6.9 | 6.8 | 6.9 | |
| GDL | 4 | 6.5 | 6.65 | 6.4 | |
| GDL | 8 | 6.45 | 5.05 | | 5.10 |
| GDL | 16 | 6.45 | 5.60 | | 5.40 |

EXAMPLE 2

*Composition B*

| | Parts by weight |
|---|---|
| Sodium chloride | 25 lbs.-2.25 ozs. (less value of $x$ below). |
| Sodium nitrite | 13 ozs. |
| Sodium nitrate | 8.75 ozs. |
| Sodium bicarbonate | 12 ozs. |
| Sodium cyclamate | 6.8 ozs. |
| Sodium erythorbate [1] | 5.25 ozs. |
| Glycerol | 4.2 ml. |
| GDL | $x$. |
| Approximate total | 28 pounds. |

[1] Also known as sodium isoascorbate.

Composition B, with varying values of $x$, was made into a brine using 56 pounds to produce 100 gallons. The pH of the brine was read as in Example 1, giving readings as in Table II.

TABLE II.—VALUE OF $x$ IN COMPOSITION B

| $x$ ozs. GDL | pH After Hours— | | | |
|---|---|---|---|---|
| | 0 | 1 | 18 | 22 |
| 0 | 7.45 | 7.55 | 7.60 | |
| 4 | 7.1 | 6.85 | 7.10 | |
| 8 | 6.95 | 6.70 | 6.69 | |
| 16 | 6.80 | 6.40 | 6.25 | |
| 18 | 6.5 | 6.20 | | 5.60 |
| 22.4 | 6.4 | 6.10 | | 5.35 |

EXAMPLE 3

*Composition C*

| | Parts by weight |
|---|---|
| Sodium chloride | 88.00 |
| Sodium nitrite | 6.07 |
| Sodium nitrate | 4.07 |
| Sodium citrate dihydrate | 1.75 |
| Glucono delta lactone | $x$ |

Composition C, except for GDL, is a commercial curing salt composition made with commercial ingredients in which the sodium citrate inhibits caking of a powder form. It was used in the amount of 27 pounds to make 100 gallons of brine which contained in addition 30 pounds of cane sugar and 143 additional pounds of sodium chloride to make 167 pounds of sodium chloride.

The brine was tested as in Example 1, as shown in Table III.

TABLE III.—VALUE OF $x$ IN COMPOSITION C

| $x$ ozs. GDL | pH After Hours— | | | |
|---|---|---|---|---|
| | 0 | 1 | 18 | 22 |
| 0 | 7.60 | 8.10 | 7.85 | |
| 8 | 6.80 | 6.80 | 6.85 | |
| 16 | 6.50 | 6.50 | 6.20 | |
| 32 | 6.45 | 6.05 | | 5.25 |
| 80 | 6.00 | 5.85 | 4.50 | |

EXAMPLE 4

| | Parts by weight |
|---|---|
| Sodium chloride | 2 lbs.-10 ozs. |
| Sodium nitrite | 1.1 ozs. |
| Sodium nitrate | 1.28 ozs. |
| Sodium erythorbate | .75 oz. |
| Sodium bicarbonate | 2.5 ozs. |
| Glucono delta lactone | 22.0 ozs. |

EXAMPLE 5

[For a cover pickle]

| | Parts by weight |
|---|---|
| Sodium chloride | 2 lbs.-10 ozs. |
| Sodium erythorbate | .75 oz. |
| Sodium bicarbonate | 2.5 ozs. |
| Glucono delta lactone | 8 ozs. |

EXAMPLE 6

| | Parts by weight |
|---|---|
| Sodium chloride | 1.25 |
| Sodium erythorbate | .75 |
| Glucono delta lactone | 3 |

For addition to 1600 parts of meat for comminuted meat products.

EXAMPLE 7

| | Parts by weight |
|---|---|
| Sodium chloride | 13.75 |
| Sodium erythorbate | .75 |
| Glucono delta lactone | 3.0 |

Spice seasonings, to taste.

For addition to 1600 parts of meat for comminuted meat products.

EXAMPLE 8

| | Parts by weight |
|---|---|
| Paprika | 3 |
| Anhydrous corn sugar (dextrose) | 1 |
| Glucono delta lactone | 4 |

As indicated in the examples above, some compositions may contain an alkali reserve agent, such as sodium bicarbonate. This takes up an equivalent of acid generated from GDL. Also, the sodium from sodium nitrite takes up acid to the extent that released nitrous oxide is lost or combines with the meat. For these reasons the minimum amount of GDL will vary and it cannot be precisely specified, except by its function, which depends upon the companion ingredients and the conditions of use. It is not the presence of gluconic acid from the GDL, or the acid from another lactone, that is important. Rather it is the maintenance of a pH below 7 in the functioning pickle that is important. There should be sufficient lactone in the dry solid composition to effect and maintain in the presence of meat an acid pH in the range from 5 to 7 in an aqueous mass in which the composition is dissolved, whether said mass be comminuted meat or an aqueous solution, said pH being effected and maintained as the aqueous mass ages and as it functions in the presence of meat. If the pH of a pickle prepared for use and not in use, falls below pH of 5 the composition producing that pickle is not considered as outside of the present invention because when it is introduced to meat the buffering action of the meat will elevate the pH.

Other lactones are available and to date none have been found which hydrolyze in water faster than GDL. However, there are meat treating procedures where the pickle functions over periods of days, and for such processes the slower hydrolyzing lactones may be used. In Table IV below, 500 mg. of various lactones have been used in 100 ml. of water at 80° F. merely for comparative tests. The changing pH with time is given, and the amount of alkali reported which was required to elevate the pH to 6. Although the pH values go well below the pH of meat, it is to be understood that when present in a pickle and in contact with meat, the buffering action of the meat prevents the pickle attaining such a low pH value.

TABLE IV

| Lactone | Length of Hydrolysis | pH at 80° F. | Hydrolysis—ml. of 0.1 N Sodium hydroxide to Adjust the pH to 6.0 at 80 °F. |
|---|---|---|---|
| Glucono Delta Lactone | 5 minutes | 4.2 | 5.5 |
|  | 30 minutes | 3.0 | 10 |
|  | 1 hour | 2.8 | 11.2 |
|  | 2 hours | 2.8 | 17.5 |
|  | 16 hours | 2.8 | 25.5 |
| Maltobiono Delta Lactone | 5 minutes | 4.2 | 2.4 |
|  | 1 hour |  |  |
|  | 16 hours | 3.2 | 10.7 |
| Lactobiono Delta Lactone | 5 minutes | 3.8 | 5.7 |
|  | 1 hour |  |  |
|  | 16 hours | 3.5 | 9.7 |

EXAMPLE 9

Because of the loss of acidity by loss of nitrous acid, the changing pH due to GDL has been measured in a pickle-composition lacking in nitrite salt. Using 100 pounds of the composition A of Example 1 minus the nitrite salt and 4 and 6 ounces of GDL, the lowering pH was determined over a period of 24 hours as set forth in Table V.

TABLE V

| Hours | pH on Standing | |
|---|---|---|
|  | 4 ozs. GDL | 6 ozs. GDL |
| 0 | 6.45 | 6.45 |
| 1 | 6.05 | 6.05 |
| 17 | 5.57 | 5.55 |
| 24 | 5.60 | 5.25 |

EXAMPLE 10

Using 16 ounces of GDL per 28 pounds of composition A of Example 1, as the acidic agent and omitting the nitrite salt, the pH change on standing was determined as given in Table VI.

TABLE VI

| Hours: | pH on standing |
|---|---|
| 0 | 6.70 |
| 1 | 6.25 |
| 17 | 6.05 |
| 24 | 5.85 |

EXAMPLE 11

[LACTOBINO DELTA LACTONE (LDL)]

Using the commercial curing salt composition C of Example 3, and changing the lactone to $x$ ounces of lactobiono delta lactone per 100 pounds of said composition, the pH has been followed as in Table VII. Composition C was used in amount of 54 pounds to 100 gallons containing in addition 30 pounds of cane sugar and an additional 143 pounds of sodium chloride making 167 pounds of sodium chloride.

TABLE VII

| Ounces LDL/100 lbs. | pH After Hours— | |
|---|---|---|
|  | 4 | 44 |
| 0 | 7.90 | 8.35 |
| 8 | 7.00 | 7.85 |
| 16 | 6.35 | 7.50 |
| 32 | 6.05 | 7.35 |
| 80 | 4.95 | 5.05 |

The invention is not limited to or by the illustrative examples given above, and other formulations are contemplated as falling within the scope of the invention as set forth in the appended claims.

I claim:

1. A dry solid composition for use in processing meat comprising soluble meat-treating material and a quantity of lactone which slowly hydrolyzes to acid when dissolved in water and forms harmless acid, the quantity of said lactone on hydrolysis effecting and maintaining in the presence of meat an acid pH in the range from 5 to 7 in an aqueous mass in which said composition is initially dissolved.

2. A dry solid composition according to claim 1 in which soluble material comprises material selected from the group consisting of isomers of ascorbic acid and water-soluble salts of isomers of ascorbic acid.

3. A dry solid composition according to claim 1 in which said soluble material comprises alkali metal nitrite.

4. A dry solid composition according to claim 1 in which said soluble material comprises an edible alkali-reserve agent.

5. A dry solid composition according to claim 1 in which said soluble material comprises alkali metal nitrite, alkali-reserve agent, and material selected from the group consisting of isomers of ascorbic acid and water-soluble salts of isomers of ascorbic acid.

6. A dry solid composition according to claim 5 in which the lactone is glucono delta lactone.

7. A dry solid curing salt composition for curing meat comprising essentially sodium chloride, alkali metal nitrite and alkali metal nitrate, and a quantity of lactone which slowly hydrolyzes to acid when dissolved in water and forms harmless acid, the quantity of said lactone effecting and maintaining in the presence of meat an acid pH in the range from 5 to 7 in a brine in which said composition is initially dissolved, said pH gradually being lowered as the fresh brine ages in the absence of meat and as the lactone hydrolyzes.

8. A composition according to claim 7 containing a water soluble salt of an isomer of ascorbic acid.

9. A composition according to claim 7 containing salt having available alkali.

10. A composition according to claim 7 containing a carbonate of sodium.

11. A composition according to claim 7 containing sodium bicarbonate.

12. A composition according to claim 7 in which the lactone is glucono delta lactone.

13. The method of treating meat which comprises producing a meat-processing liquid by dissolving in water a dry solid composition comprising soluble meat-treating material and a quantity of lactone which slowly hydrolyzes to acid when dissolved in water, and treating meat with the resulting composition containing said lactone, the quantity of said lactone on hydrolysis effecting and maintaining in the presence of said meat in contact with said liquid an acid pH in the range from 5 to 7.

14. A dry solid composition for use in processing meat comprising soluble meat-treating material and a quantity of lactone which slowly hydrolyzes to acid when dissolved in water, said lactone being selected from the group consisting of glucono delta lactone, maltobiono delta lactone, lactobiono delta lactone, and mixtures thereof, the quantity of said lactone on hydrolysis effecting and maintaining in the presence of meat an acid pH in the range from 5 to 7 in an aqueous mass in which said composition is initially dissolved.

References Cited in the file of this patent
UNITED STATES PATENTS

| | | |
|---|---|---|
| 2,627,473 | Brissey | Feb. 3, 1953 |
| 2,828,212 | Sair | Mar. 25, 1959 |

UNITED STATES PATENT OFFICE
CERTIFICATE OF CORRECTION

Patent No. 3,122,442                      February 25, 1964

Louis Sair

It is hereby certified that error appears in the above numbered patent requiring correction and that the said Letters Patent should read as corrected below.

Column 6, line 2, for "LACTOBINO" read -- LACTOBIONO --; line 37, after "which" insert -- said --; line 50, for the claim reference numeral "5" read -- 1 --.

Signed and sealed this 30th day of June 1964.

(SEAL)
Attest:

ERNEST W. SWIDER                      EDWARD J. BRENNER
Attesting Officer                      Commissioner of Patents